US009152147B2

(12) United States Patent
Khazan et al.

(10) Patent No.: US 9,152,147 B2
(45) Date of Patent: Oct. 6, 2015

(54) LOCATION BASED ACCESS CONTROL OF MATERIAL TRANSPORTATION VEHICLE RESOURCES

(71) Applicants: Roger Khazan, Arlington, MA (US); Adam Shawn Petcher, Billerica, MA (US); Daniil M. Utin, Newton, MA (US)

(72) Inventors: Roger Khazan, Arlington, MA (US); Adam Shawn Petcher, Billerica, MA (US); Daniil M. Utin, Newton, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 0 days.

(21) Appl. No.: 14/172,306

(22) Filed: Feb. 4, 2014

(65) Prior Publication Data
US 2014/0222250 A1  Aug. 7, 2014

Related U.S. Application Data

(63) Continuation of application No. 13/050,323, filed on Mar. 17, 2011, now Pat. No. 8,644,512.

(51) Int. Cl.
*H04L 29/06* (2006.01)
*G05D 1/00* (2006.01)
*H04W 56/00* (2009.01)
(Continued)

(52) U.S. Cl.
CPC ............ *G05D 1/0011* (2013.01); *G05D 1/0022* (2013.01); *G06Q 10/047* (2013.01); *H04W 4/021* (2013.01); *H04W 56/0045* (2013.01);
(Continued)

(58) Field of Classification Search
CPC ..... G05D 1/00; G05D 1/0088; G05D 1/0011; G05D 1/0022; G05D 1/02; G06Q 10/047; H04W 4/021; H04W 56/0045; H04L 2463/062; H04L 63/062; H04L 63/107
See application file for complete search history.

(56) References Cited

U.S. PATENT DOCUMENTS

2005/0065682 A1* 3/2005 Kapadia et al. ................. 701/35
2006/0266917 A1 11/2006 Baldis et al.
(Continued)

FOREIGN PATENT DOCUMENTS

EP    2 244 150    10/2010
WO    2010/039306    4/2010

OTHER PUBLICATIONS

Khazan et al., "Securing Communication of Dynamic Groups in Dynamic Network-Centric Environments," retrieved from internet: http://www.ll.mit.edu.mission/communications/ist/publications/061023_Khazan.pdf [retrieved Jun. 14, 2012] XP008152905.
(Continued)

*Primary Examiner* — Yogesh Paliwal
(74) *Attorney, Agent, or Firm* — Occhiuti & Rohlicek LLP

(57) ABSTRACT

A method for transportation of material includes operating a material transportation vehicle according to a material transportation plan. The plan includes a representation of one or more regions within a geographical area, each of the regions being associated with a group of one or more communication stations and a representation of a route of travel within the geographical area. The route of travel traverses a first region of the one or more regions within the geographical area. The operating includes causing the vehicle to travel along the route of travel including causing the vehicle to enter the first region, accepting control information originating from a first communication station of the communication stations associated with the first region, the first communication station being authorized to control a material transportation resource of the vehicle in the first region, and causing an exchange of the material according to the accepted control information.

14 Claims, 10 Drawing Sheets

(51) Int. Cl.
    *G06Q 10/04*    (2012.01)
    *H04W 4/02*    (2009.01)

(52) U.S. Cl.
    CPC ............. *H04L63/062* (2013.01); *H04L 63/107* (2013.01); *H04L 2463/062* (2013.01)

(56) References Cited

U.S. PATENT DOCUMENTS

| | | | |
|---|---|---|---|
| 2007/0086593 A1* | 4/2007 | Denning et al. ............. | 380/286 |
| 2007/0101438 A1 | 5/2007 | Govindarajan | |
| 2010/0017114 A1* | 1/2010 | Tehan et al. .................. | 701/202 |
| 2010/0084513 A1* | 4/2010 | Gariepy et al. ............... | 244/190 |
| 2011/0035149 A1* | 2/2011 | McAndrew et al. .......... | 701/205 |

OTHER PUBLICATIONS

International Search Report, PCT Application No. PCT/US2012/028845, mailed Jun. 28, 2012 (4 pages).

* cited by examiner

LOCATION BASED ACCESS CONTROL OF MATERIAL TRANSPORTATION VEHICLE RESOURCES

CROSS REFERENCE TO RELATED APPLICATIONS

This application is a continuation of U.S. application Ser. No. 13/050,323, filed on Mar. 17, 2011, the contents of which are hereby incorporated by reference in their entirety.

STATEMENT AS TO FEDERALLY SPONSORED RESEARCH

This invention was made with government support under Contract No. FA8721-05-C-0002 awarded by the U.S. Air Force. The government has certain rights in the invention.

BACKGROUND

This document relates to a mission planning interface, for example, use of a mission planning interface to specify and monitor an unmanned vehicle mission.

Modern cryptography offers a variety of effective schemes for the protection of data. However, for many applications, the lack of usability of cryptographic protection impedes its adoption. Thus, cryptographic protection is often not employed in applications because of the lack of easy to use interfaces that enable users to apply cryptographic protection through intuitive means.

One example of such an application in which there is a need for protection of data relates to use of an unmanned aerial vehicle (UAV) to broadcast tactical data (e.g., a video stream) to receivers on the ground in a war zone. In the absence of cryptographic protection, any compatible receiver would be capable of receiving and benefitting from the data. Thus, unintended receivers (e.g., enemy combatants) can have access to the same data as the intended receivers (e.g., friendly forces), thereby providing the unintended receivers with the same advantage as the intended receivers.

There is a need for an intuitive and user friendly user interface for specifying and enacting cryptographic protections for such applications.

SUMMARY

In an aspect, the invention features a method for mission planning The method includes displaying a graphical representation of a geographical area and displaying a graphical representation of one or more regions within the geographical area. The method also includes accepting a specification of geographical regions from a user, accepting a specification of a set of one or more receivers from the user, and accepting a specification of resource access rights associated with the specific one of the geographical regions from the user. The method also includes remotely causing access to a vehicle's resources to be provided or denied to the specified set of one or more receivers based on their association with the specific one of the geographical regions specified by the user when the unmanned vehicle is within the specific one of the geographical regions specified by the user.

One or more of the following features may also be included.

The vehicle can be an unmanned vehicle. Remotely causing access to the vehicle's resources to be provided or denied may include sending cryptographic information to the specified set of one or more receivers. The cryptographic information may be sent through the vehicle. The cryptographic information may include an encryption of access data for accessing the resources and the encryption of access data is formed for decryption with a key associated with a receiver. The access data may be a receiver specific key for decryption of data received from the UAV. The receiver specific key may be a private key. Remotely causing access to the vehicle's resources to be provided or denied may include causing the vehicle to provide or deny access to the resources.

The resource access rights may include at least one of acquired data access rights and vehicle control access rights. The resource access rights may include at least one of flight control system access rights, weapons control system access rights, and surveillance control system access rights. The resource rights may include video acquisition rights. Part of a flight plan of a vehicle including geographic path information may be displayed. Accepting the specification of the set of one or more receivers from the user may further include associating the set of one or more receivers with a specific one of the geographical regions. A range of time may be specified by the user and the set of one or more receivers is associated with the specific one of the geographical regions for the range of time.

In another aspect, the invention features a system at a vehicle control station. The system includes a display for displaying information to a user. The display information includes a graphical representation of a geographical area, a graphical representation of one or more regions within the geographical area, and data acquired by the vehicle. The system also includes an input device for accepting information from the user. The accepted information includes a specification of geographical regions, a specification of a group of receivers, and a specification of resource access rights associated with a specific one of the geographical regions. The system also includes a data storage device, and a database implemented on the data storage device for storing a mission plan. The mission plan includes a data representation of the geographical area, a data representation of the one or more regions within the geographical area, and the data acquired by the vehicle. The system also includes a communication module for communication with the vehicle.

One or more of the following features may also be included.

The vehicle can be an unmanned vehicle. The resource access rights may include acquired data access rights and vehicle control access rights. The resource access rights may include at least one of flight control system access rights, weapons control system access rights, and surveillance control system access rights. The resource rights may include video acquisition rights. The display information may further include a part of a flight plan of a vehicle including geographical path information. The specification of the group of receivers may further include an association of the group of receivers with a specific one of the geographical regions. The specification of the group of receivers may further include a specification of a range of time that the group of receivers is to be associated with the specific one of the geographical regions. The mission plan may further include at least part of a flight plan of the vehicle including path information.

Embodiments may have one or more of the following advantages.

Employing a usable and intuitive interface to apply complex encryption schemes frees the operator of a mission planning system from having to understand the details of encryption schemes. The implementation of the encryption schemes can occur "under the hood" and out of view of the operator. Thus, applications that would normally avoid the use of encryption schemes are more likely to incorporate encryption because the encryption process is transparent to the user.

An intuitive user interface enables users to easily implement complex encryption schemes that are, for example, based on a number of parameters such as the publisher's identities, the subscriber's identities, locations of the publishers and/or subscribers, times, and other conditions.

Other features and advantages of the invention are apparent from the following description, and from the claims.

DESCRIPTION

1 System Overview

Figure 1:
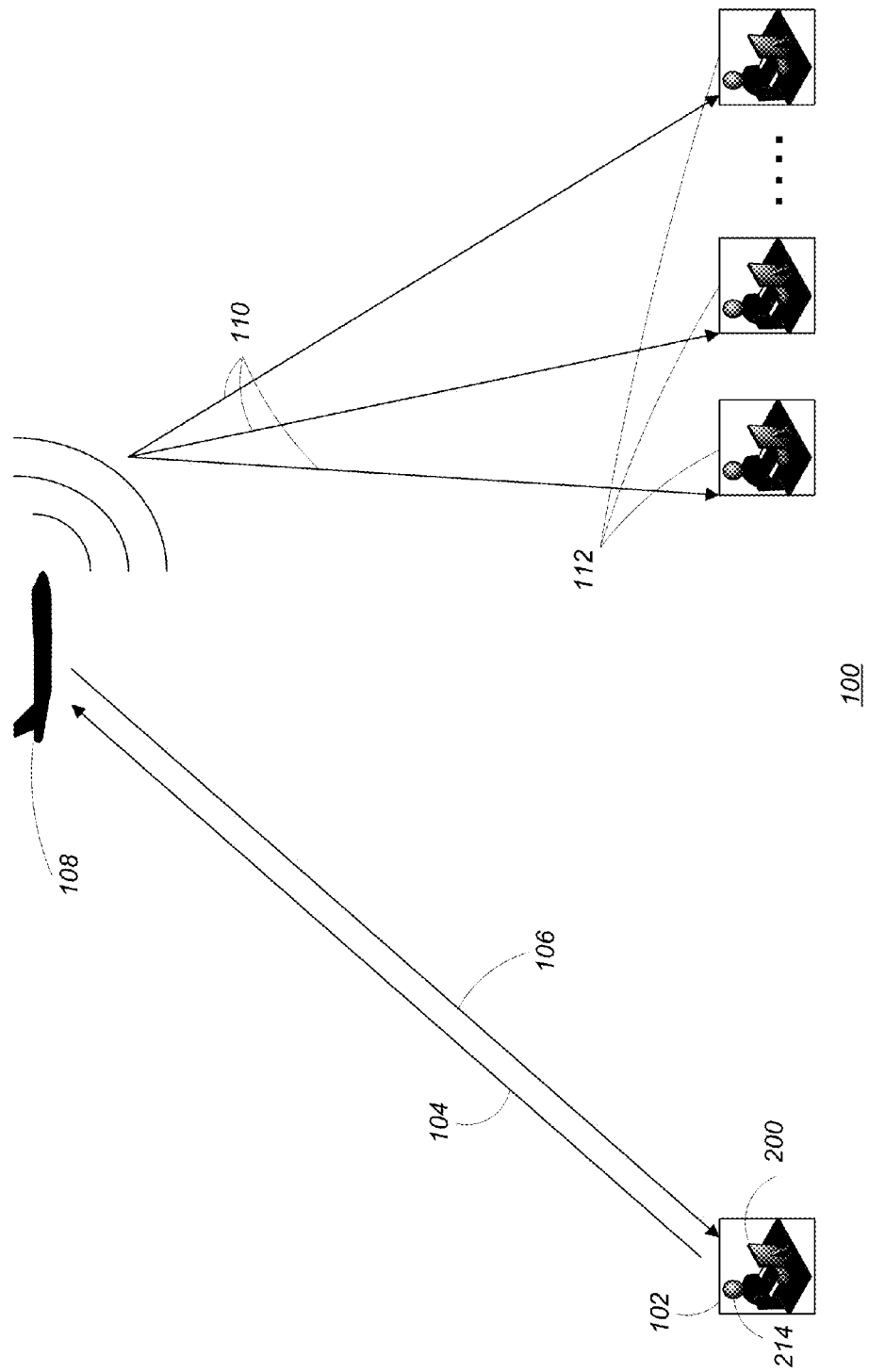
FIG. 1 is a high level overview of a typical mission planning and execution system including a mission planning user interface.

As illustrated in FIG. 1, the following description relates to a number of embodiments of a mission planning and execution system 100 used for planning and executing a mission of an unmanned aerial vehicle (UAV) 108, including controlling access to acquired data and in-mission control of the vehicle. In general, the system includes one or more UAVs 108, and two or more ground stations 102, 112, for instance, one control station 102 and one or more receiver stations 112.

In some examples, the control station 102 of the system includes a user interface that provides the operator 214 with a way to specify access control rules that affect access to UAV 108 resources (e.g., broadcast content, flight systems control, and weapons systems control) at receiver stations 112. Generally, enforcement of the access control is based on cryptographic techniques such that a receiver station 112 can only decrypt content 110 broadcast from the UAV 108 to which that station is authorized according to the access control rules.

In some examples, the access control rules can be based on the geographic locations of the UAV 108, and may be based on other factors such as the location of the receiver station 112, the current time, or other conditions. In some examples, as the location of the UAV 108 changes during execution of a mission, the system automatically consults the access control rules for the mission to determine which receiver stations have authorized access to the broadcast content 110 from the UAV 108. Based on this determination, the system modifies cryptographic aspects of the transmission from the UAV 108 so that only an authorized subset of receiver stations 112 is able to access or decrypt the broadcast content 110.

In some examples, the broadcast 110 from the UAV 108 includes content encrypted with a temporary key, which is referred to below as the "session key" without intending to confer any particular properties to the key according to this label. In general, the session key can change from time to time, and is changed whenever the set of authorized receiver stations changes. In conjunction with the transmission of the encrypted content, the session key in use is securely transmitted to the authorized receiver stations. For example, the system may broadcast the session key itself encrypted in a manner that authorized receiver stations can decrypt the session key in parallel (e.g., time or frequency multiplexed) with the broadcast of the encrypted content. The distribution of keys to receiver stations can be completely transparent to the receiver stations unless the stations' resource access rights have changed.

For the purpose of brevity and without limitation, the mission planning interface and overall system design is described below in the context of UAV mission planning It should be clearly understood that other mission planning and execution systems can be implemented using approaches similar to those presented below.

One typical application of the mission planning interface 200 described in this document is a data dissemination system including UAVs 108 broadcasting video surveillance data to mobile receiver stations 112 on the ground. The UAV operator 214 may want to employ cryptographic protections to control which receiver stations 112 can access the UAV's video feed based on certain conditions (such as the UAV's location). In some situations, the UAV operator 214 may want to specify these access control rules in advance and have them enforced automatically.

As described more fully below, in some examples, the control station 102 includes an intuitive map-based interface 200 that permits the operator 214 to specify access rules that are to be in effect when the UAV 108 is located in corresponding geographic regions.

Continuing to refer to FIG. 1, in an example scenario, a UAV operator 214 operates the control station 102 via a mission planning user interface 200 to specify a UAV flight plan that indicates the geographical path for the UAV 108 to follow. The operator also specifies access control rules that restrict access by receiver stations 112 to data 110 that is broadcast by the UAV 108. The specification of access control rules is further discussed below.

As the UAV 108 travels along the user specified flight path, it acquires data (e.g., video content) and sends mission state information 106 to the controller station 102 including the UAV's current geographic location. The controller station 102 compares the mission state information received from the UAV 108 to the user specified access control rules and uses the result of the comparison to determine which receiver stations 112 in the geographical area are authorized to access the broadcast data 110. Based on this determination, the control station transmits authorization data to the UAV 108, which is used at the UAV 108 to encrypt the acquired data (as is further described below) and then broadcast 110 over a geographical area (e.g., within the broadcast range of the UAV 108). In this example, the UAV 108 also retransmits the authorization data in conjunction with the encrypted data.

A receiver station 112 acquires the broadcast 110, including the encrypted content and the authorization data, and may attempt to decrypt the data. Based on the authorization data, the receiver station will or will not be able to decrypt the encrypted data 110. More specifically, the authorization data that is retransmitted via the UAV 108 only provides the cryptographic keys necessary to decrypt the data to the receiver stations that are authorized to access that data.

2 Mission Planning User Interface

Figure 2:
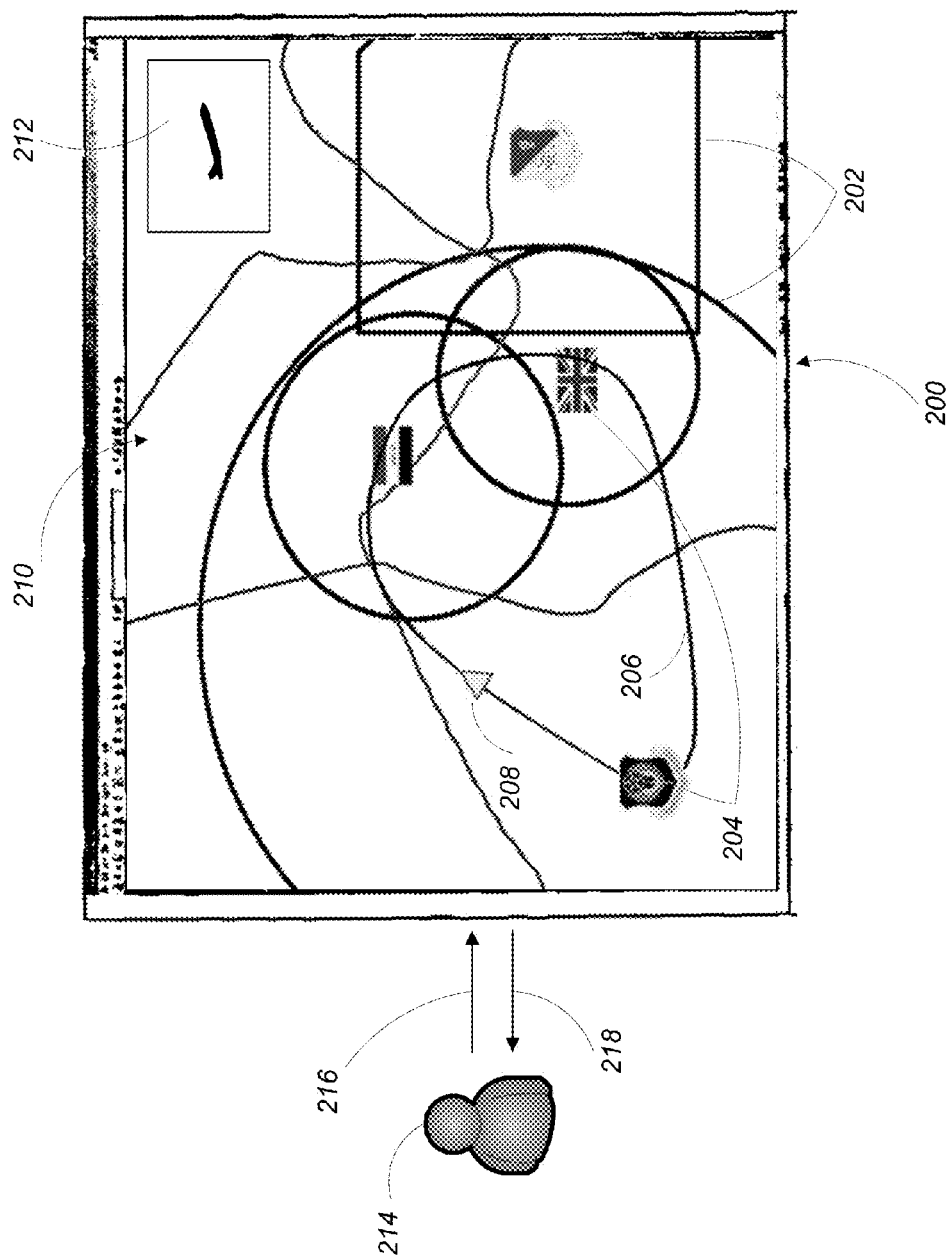
FIG. 2 is a screen capture of one embodiment of a mission planning user interface.

Referring to FIG. 2, a graphical user interface 200 at the control station 102 is configured to accept input 216 from the UAV operator 214 to specify access control rules. The operator 214 specifies one or more geographic regions 202 (e.g., as circular regions by specifying a center and a radius) on a map of a geographical area 210. For each of the specified regions 202, the operator specifies corresponding groups of receiver stations 204 or individual receiver stations 204. This association defines which receiver stations 204 are authorized to access the UAV's 208 resources (e.g., data broadcast 212) while the UAV is in particular regions 202.

During mission execution, the mission planning user interface 200 is configured to present "real time" feedback 218 to the operator 214, for instance showing the location of the UAV and indentifying the receiver stations that are authorized at that time to access the data.

As introduced above, the UAV operator 214 can specify geographic regions 202 by using a computer mouse or other user input tool (e.g., a touch screen). The shape of the geographic regions 202 can be predefined (e.g., a circle or square) or a hand drawn custom shape. In some embodiments, a geographic region 202 can correspond to the complete geographic area 210 or the exclusion of a defined region from the complete geographic area 210. In other embodiments, the geographic regions 210 may move over time, or example being centered on a moving asset. Alternatively, a set of saved or predefined geographical regions 202 can be loaded from a library on disk. For example, saved regions can correspond to political divisions such as city or province boundaries.

As introduced above, the UAV operator 214 can specify the set of receiver stations 204 associated with geographic regions 202, for example, by choosing the receiver stations or groups of receiver stations 204 from a list. Alternatively, a predefined group of receiver stations can be loaded from a library on disk. For example, a group of receiver stations can correspond to grouping of military troops (e.g., particular divisions of a country's army) or based on other attributes or meta information.

In some examples, the UAV operator 214 can specify the resource access rights associated with a group of receiver stations 204, for example, by marking a checkbox if a specific receiver station is allowed access to data 212 acquired by the UAV 208 and unmarking the checkbox if the receiver station 204 is not allowed access to resources on board the UAV 208 (e.g., data 212 acquired by the UAV 208). Alternatively, a predefined configuration of resource access rights can be loaded from a library on disk.

The access control rules specified by the UAV operator 214 can be enforced entirely automatically during the mission based on the UAV's geographical location and other conditions. Additionally, the mission planning interface 200 may provide feedback 218 to the UAV operator 214 such that the UAV operator 214 can evaluate the progress of the mission. Based on the provided feedback 218, the UAV operator 214 may be allowed to modify the specified mission plans while the mission plan is executing.

To display feedback to the UAV operator 214, the mission planning user interface 200 may utilize a display (e.g., a computer monitor). In particular, the mission planning user interface 200 may be configured to present the graphical representation of the geographical area 210 to the UAV operator 214. The graphical representation of the geographical area 210 can represent any type of geographical area, for example a theater of war, a metropolitan area, or a farmer's fields.

The display can also present a number of graphical representations of geographical regions 202 within the larger geographical area 210. The regions 202 define an area where a specific set of receiver resource access rights is applied. The graphical representations of geographical regions 202 in FIG. 2 are shown having a circular shape but are not limited to any specific shape. Additionally, the graphical representations of geographical regions 202 can overlap or be mutually exclusive.

The mission planning user interface 200 can display the current receiver resource access rights (not shown) that are associated with one or more of the specified geographical regions 202 to the UAV operator 214. For example a list of receiver stations 204 can be displayed with checkboxes indicating whether or not each receiver station 204 can access the data acquired by the UAV. FIG. 2 illustrates a simpler example where each geographical region is associated with a country flag indicating that troops from that country can access the broadcast data 212 from the UAV operator 214 when the UAV 208 is in the specific geographical region 202 that is associated with the country flag.

In other examples, some of the graphical representations of geographical regions 202 can be associated with the removal of resource access rights for certain groups of receiver stations. For example, when a UAV monitoring Washington, DC flies within a 2 mile radius of the White House, authorization for public access to broadcast data can be revoked while authorization for military access to the broadcast data remains in effect.

The association of receiver resource access rights with a specified geographical region 202 is an example of an access control rule. More complex access control rules can take into consideration time, the location of the receiver station, and other parameters. For example, a group of receivers can be granted access to a UAV resource during only a certain range of time during the day (e.g., 8 AM to 5 PM). Additionally, the graphical user interface 200 can allow the UAV operator 214 to specify and save different access control rules for different types of missions, and to instantly enable a particular set of rules for the mission at hand, for example, by loading access control rules from disk.

The flight path 206 of one or more UAVs 208 can also be displayed to the UAV operator 214 by the mission planning user interface 200. The flight path 206 can be of any shape (e.g., FIG. 2 shows a substantially ovular flight path). Additionally, an indicator 206 (e.g., a triangle) can be displayed to the UAV operator 214. The indicator can inform the UAV operator 214 of the current geographical location and direction of travel of the UAV 208 along its flight path 206.

The mission planning user interface 200 can provide feedback 218, including mission state information to the UAV operator 214. For example, when the UAV 208 enters or leaves one of the geographical regions 202 a line defining the geographical region 202 may flash to indicate that the receiver resource access rights are being updated. In other examples, the symbol representing the UAV 208 can provide feedback to the UAV operator 214 by, for example, flashing when updating access rights or indicating the security status of command and control or video streams.

Data acquired by the UAV 206 may be displayed to the UAV operator 214 on the mission planning user interface 200. For example, FIG. 2 shows an acquired video feed 212 located in the upper right hand corner of the mission planning user interface 200.

3 Controller Station

Figure 3:
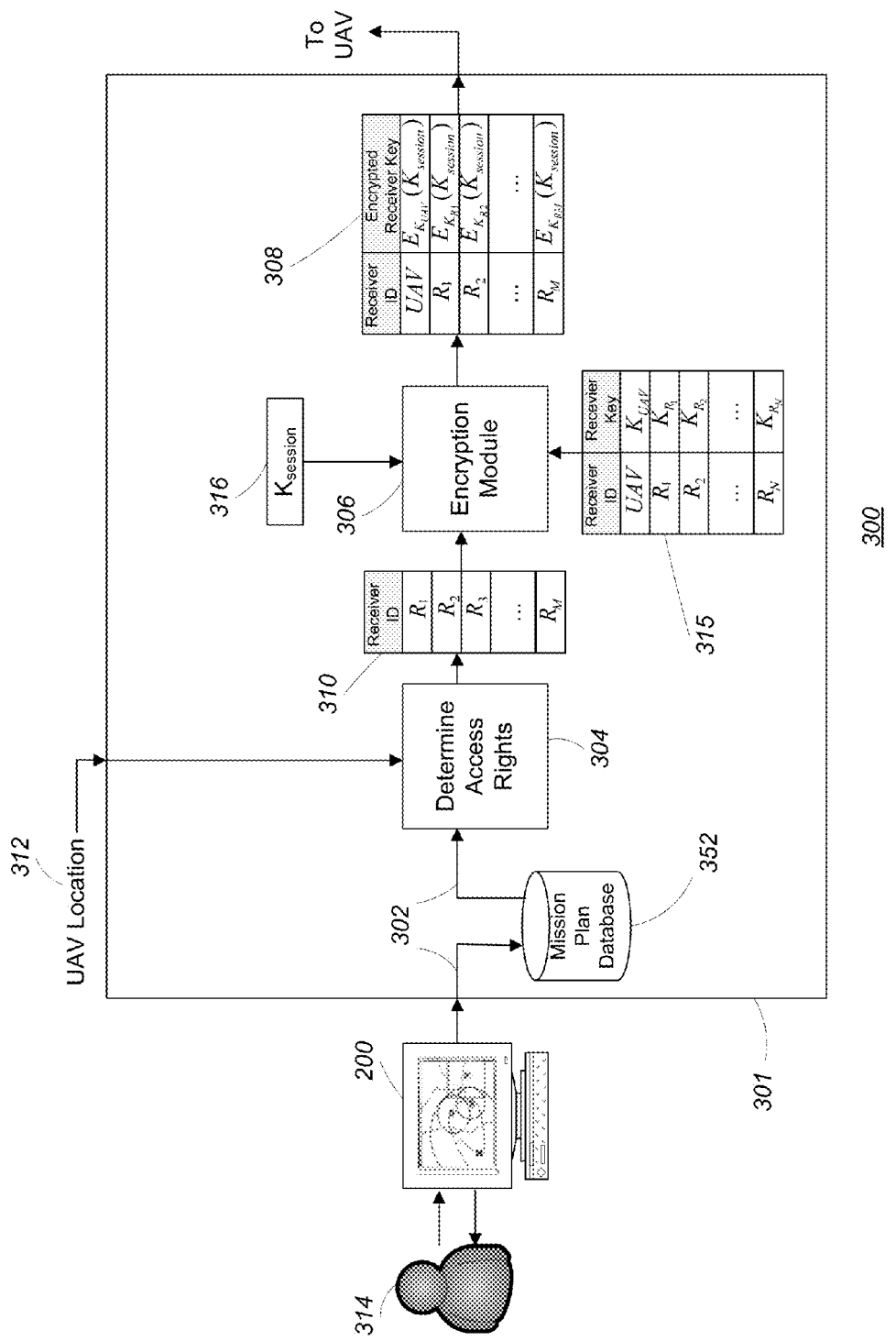
FIG. 3 is a block diagram of one embodiment of a controller station configured to send commands to a UAV data broadcasting system.

Referring to FIG. 3, one embodiment of a controller station 300 (an example of the controller station 102 of FIG. 1) is configured to execute a mission plan 302 specified by the UAV operator 314 at the mission planning user interface 200. The controller station 300 includes the mission planning user interface 200 for creating a mission plan 302, and a controller peripheral 301 for communicating the mission plan to the UAV. The controller peripheral 301 includes a resource access rights determination module 304 for determining the current resource access rights 310 and an encryption module 306 for forming an access control packet 308.

When the UAV operator 314 specifies a mission using the mission planning user interface 200, a mission plan 302 is formed and sent to the controller peripheral 301 where it is stored in a mission plan database 352. The resource access rights determination module 304 reads the mission plan 302 from the mission plan database 352 and then determines the current set of resource access rights 310 by comparing the access control rules specified in the mission plan 302 to the current UAV location 312. The current set of resource access rights 310 includes the group of receiver stations and their corresponding resource access rights for the current UAV location 312. For example, the current set of resource access rights 310 can include a set of receiver IDs corresponding to receiver stations which are authorized to decrypt the data broadcast by the UAV.

The encryption module 306 receives the previously determined current set of resource access rights 310, a session key 316, and a list of IDs associated with the UAV and receiver encryption keys 315. The encryption module 306 first determines the encryption keys of the authorized receiver stations by comparing the current set of resource access rights 310 to the list of receiver IDs 315. The encryption module then uses the determined encryption keys to encrypt the session key 316 such that the UAV and each receiver station with access rights to data acquired by the UAV can decrypt the session key 316. The result of the encryption module 306 is an access control packet 308 that includes a list of authorized receiver IDs, each receiver ID associated with the encrypted session key that can be decrypted by that particular receiver station. The access control packet 308 also includes an encryption of the session key in a form that can be decrypted by the UAV. The access control packet 308 is transmitted to the UAV by the controller peripheral 301.

Periodically, and at least when resource access rights change, for instance, because the UAV traverses a region boundary specified by the UAV operator 314 or when the mission plan 302 is altered, the controller station generates a new session key 316.

The controller station 300 typically updates the access control packet and transmits the new session key to the UAV at least when the UAV traverses the boundaries of the geographical regions.

In some examples, the controller peripheral 301 is not a separate entity from the computer that hosts the mission planning user interface 200 (as in FIG. 3). Such examples implement the functionality of the controller peripheral 301 in computer software before transmitting the access control packet 308 to the UAV.

4 UAV

Figure 4:
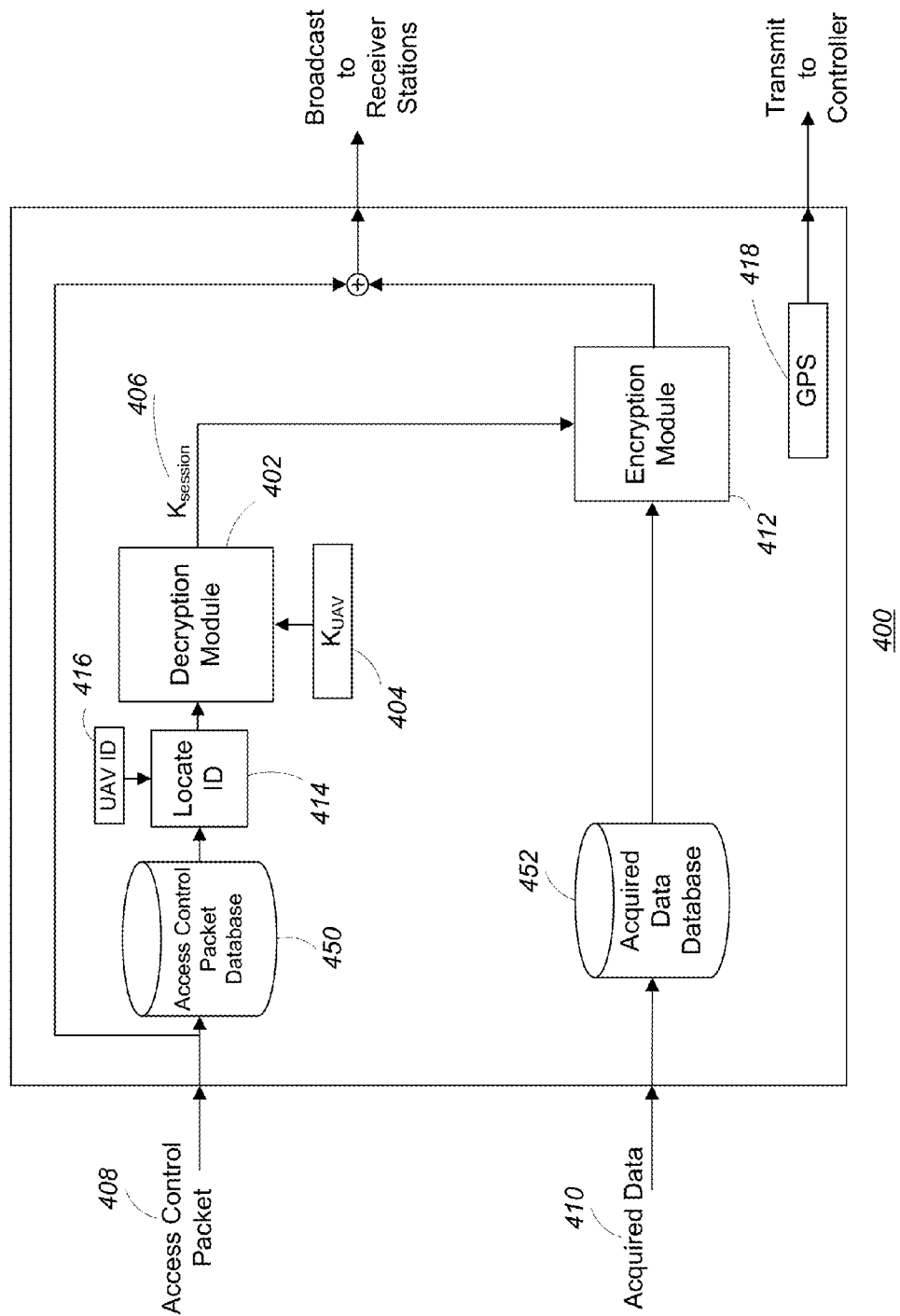
FIG. 4 is a block diagram of one embodiment of a UAV data broadcasting system configured to be controlled by a geographically remote controller station.

Referring to FIG. 4, one embodiment of a UAV data broadcast system 400 can be used to encrypt and transmit acquired data 410 (e.g., a video stream) to a group of receiver stations. The data broadcast system 400 includes a decryption module 402 for extracting the session key 406 from the access control packet 408 and an encryption module 412 for encrypting data acquired by the UAV with the session key 406.

When the UAV data broadcast system 400 receives an access control packet 408, it is stored in an access control packet database 450. The access control packet 408 is read from the access control packet database 450 by an ID location module 414 that searches the list of authorized receiver IDs included in the access control packet 408 for the UAV ID 416. Once the UAV ID 416 is found in the list, the corresponding encryption of the session key associated with the UAV ID 416 is provided to the decryption module 402 which decrypts the encryption of the session key using a UAV decryption key 404. The result of the decryption module 402 is a decrypted session key 406.

In parallel to the session key decryption process, the data (e.g., a video stream) acquired by the UAV is stored to an acquired data database 452. The encryption module 412 reads the acquired data 410 from the acquired data database 452 and uses the session key 406 to encrypt the acquired data 410. Both the encrypted acquired data and the access control packet 408 are broadcast to the receiver stations.

5 Receiver Stations

Figure 5:
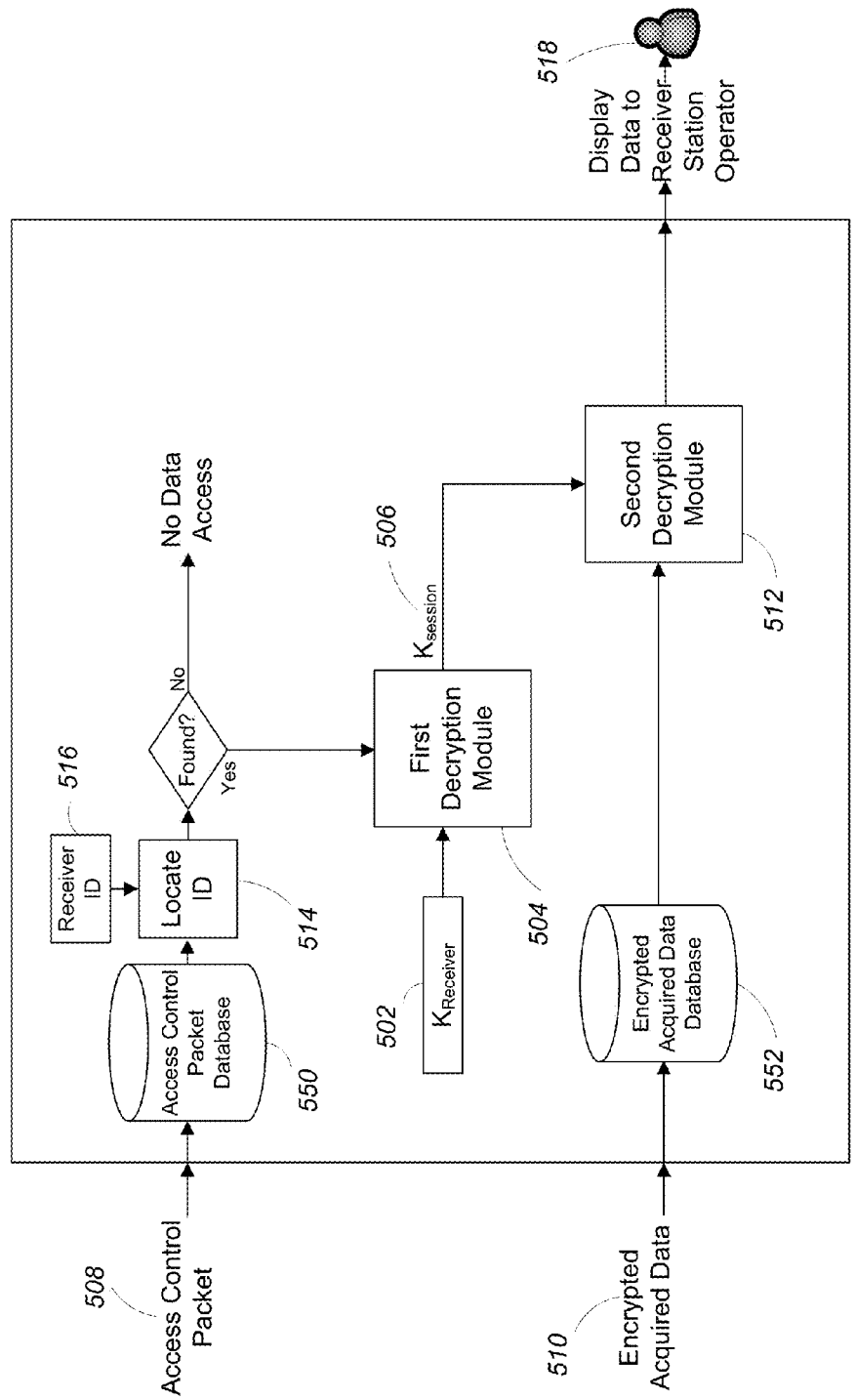
FIG. 5 is a block diagram of one embodiment of a receiver station.

Referring to FIG. 5, an embodiment of a receiver station 500 is configured to receive an encrypted data broadcast (e.g., an encrypted video stream) and decrypt the encrypted data if authorized by the access control packet 508. The receiver station 500 includes a first decryption module 504 for extracting the session key 506 from the access control packet 508 and a second decryption module 512 for decrypting the encrypted acquired data 510 using the session key 506.

When the receiver station 500 receives an access control packet 508, it is stored in an access control packet database 550. The access control packet 508 is read from the access control packet database 550 by an ID location module 514 that searches the list of authorized receiver IDs included in the access control packet 508 for an ID corresponding to the receiver ID 516. If the receiver ID 516 is not found in the list, the receiver station 500 associated with the receiver ID 516 is not authorized to decrypt the encrypted acquired data 510.

If the receiver ID 516 is found in the list, the encrypted session key associated with the receiver ID 516 is provided to the first decryption module 504 which decrypts the encrypted session key using a receiver decryption key 502. The result of the first decryption module 502 is a decrypted session key 506.

In parallel to the session key decryption process, the receiver station 500 receives encrypted acquired data 510 (e.g., a video stream) that is broadcast from the UAV and stores the data to an encrypted acquired data database 552. The second decryption module 512 reads the encrypted acquired data 510 from the encrypted acquired data database 552 and uses the decrypted session key 506 to decrypt the encrypted acquired data 510. The resulting decrypted acquired data is transmitted for display to the operator of the receiver station 518.

6 Encryption

The mission planning user interface presented in this application can be used to facilitate the implementation of a variety of encryption schemes in an intuitive and user friendly manner. For example the encryption scheme could use public/private key cryptography in which the controller station or UAV encrypts the session key for each receiver station with the receiver station's public key. Only the receiver station possessing the correct private key can decrypt the session key and access encrypted data.

In another example, symmetric key encryption can be utilized. In this example, the controller station or UAV encrypts the data using a key that is known to both the controller station or UAV and the authorized receiver stations. Thus the key is a "shared secret" between the transmitter and receiver station.

Another more typical scheme is hybrid encryption which uses both public/private key encryption and symmetric encryption. For example, public/private key encryption may be used to communicate a symmetric key to authorized receiver stations. This scheme allows for secure distribution of symmetric keys for the purpose of "re-keying".

Similarly, Dynamic Group Keying (DGK) can be used to change the UAV's data encryption key at any time and to securely distribute the new key to the UAV and authorized receiver stations or groups of receiver stations using, for example, MIT Lincoln Laboratory's Over-The-Air Keying (OTAK) protocol.

In some other examples, a password can be associated with a group of receivers that are associated with a geographic region. The password can be disseminated out of band to the group of receivers and used by the receivers to access a password encrypted decryption key, thus permitting the receivers to access the encrypted data. For example, within a given geographic region, the police department can be associated with one password and the fire department can be associated with another password. If it is deemed that the fire department no longer requires access to the encrypted data, the fire department password can be changed, thereby withdrawing access from all receivers utilizing the original password.

7 Mission Plan Executed on UAV

Certain alternative embodiments implement the overall functionality described above with different allocation of tasks between the controller station and the UAV or other elements of the system.

In one such alternative embodiment, the mission planning and execution system 100 presented in FIG. 1 is configured to execute a mission plan autonomously on the UAV 108. This is in contrast to the first embodiment of the system 100 which executes a mission plan at the controller station 102. Besides the difference in the location of mission plan execution, this alternative embodiment utilizes the same basic components and performs substantially the same function as the system 100 presented in FIG. 1 for mission plan execution.

Figure 6:
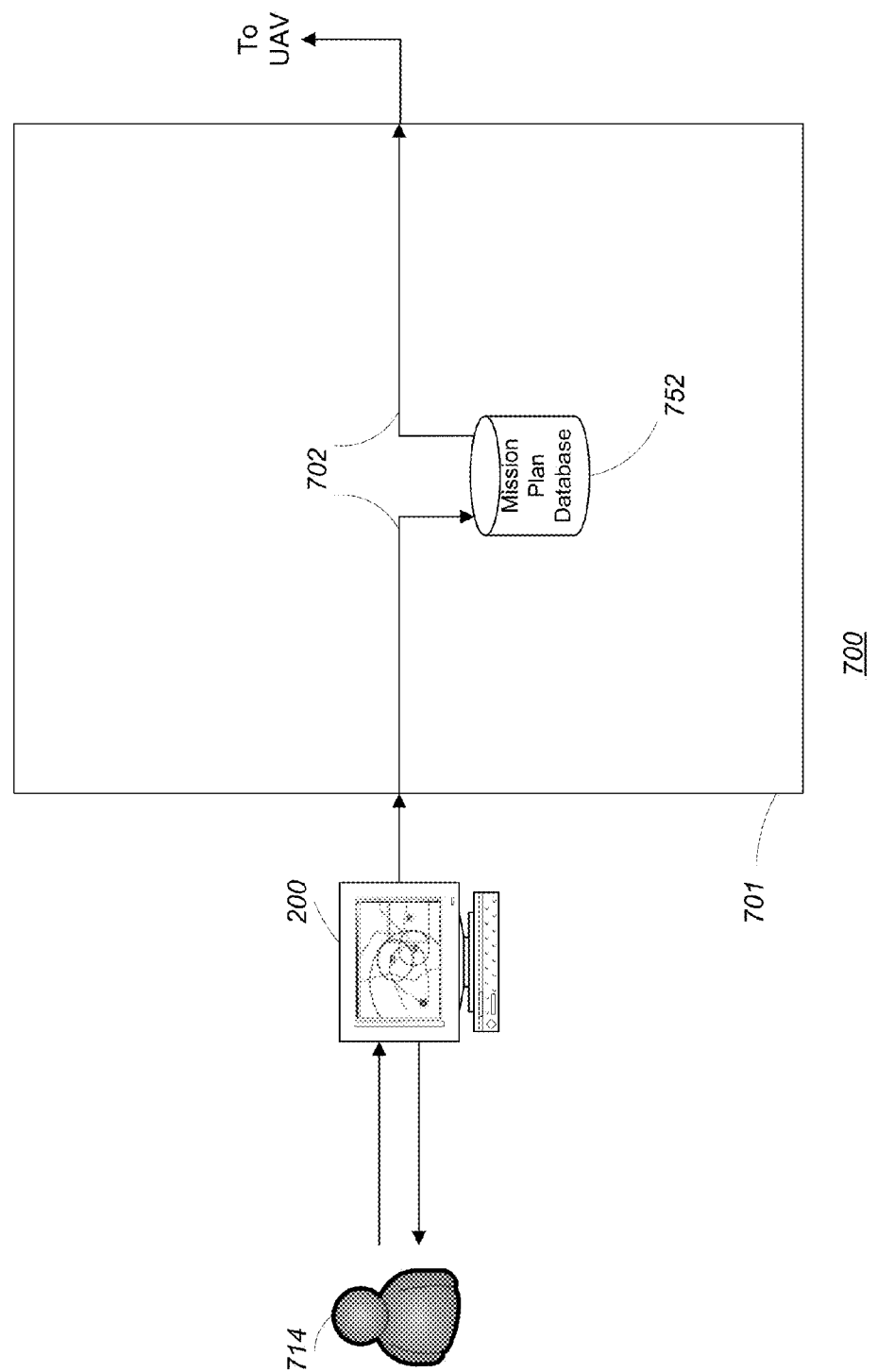
FIG. 6 is a high level overview of a mission planning and execution system configured for a UAV to execute a mission plan autonomously.

Referring to FIG. 6, the controller station 700 (an example of the controller station 102 in FIG. 1) is configured to accept the specification of the mission plan from the UAV operator 714 through the mission planning user interface 200. The mission plan 702 is then formed and passed to a controller peripheral 701. The controller peripheral 701 stores the mission plan in the mission plan database 752. The mission plan 702 is read from the mission plan database 752 and transmitted to the UAV.

Figure 7:
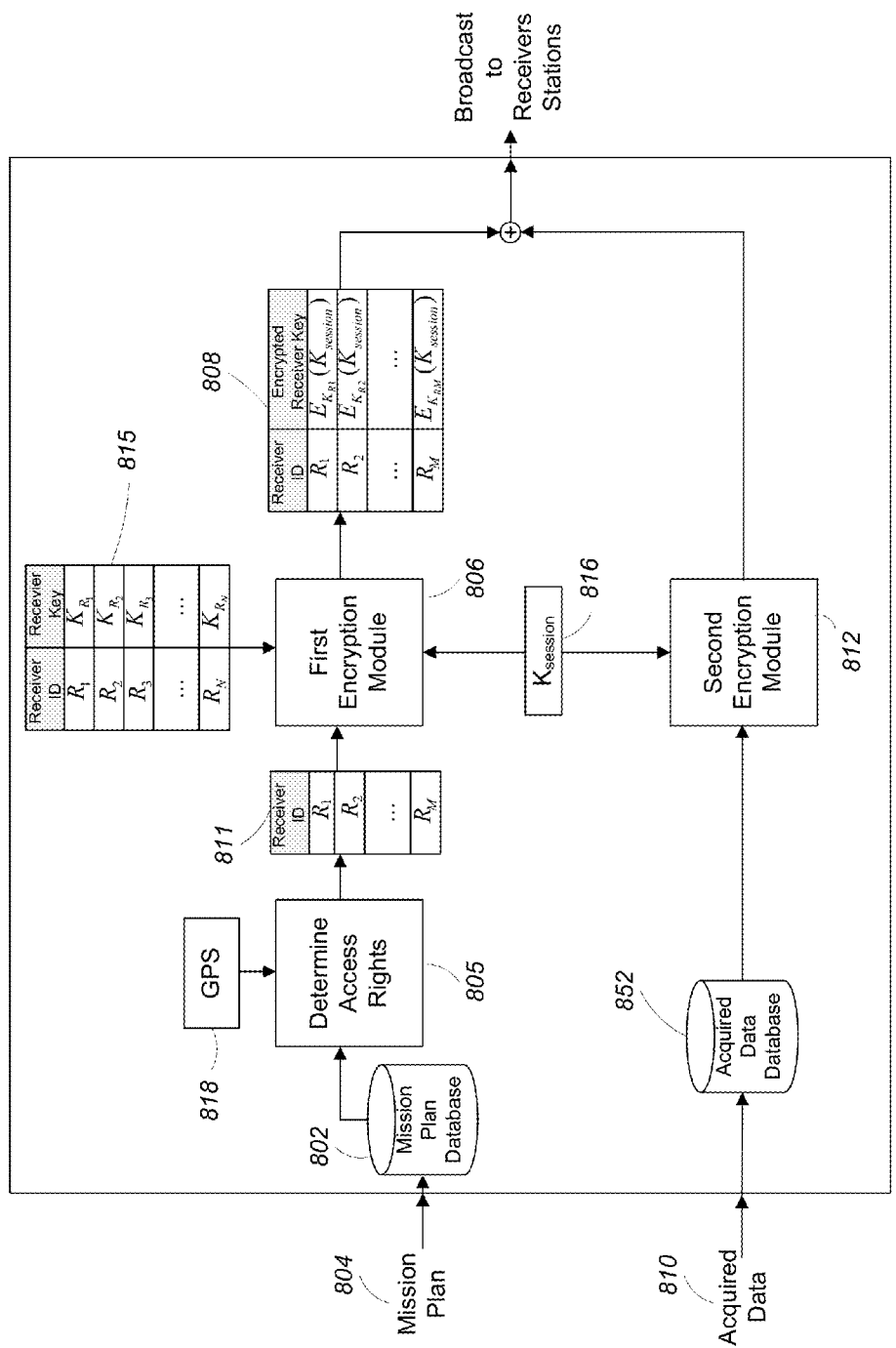
FIG. 7 is a block diagram of one embodiment of a controller station configured to send a mission plan to a UAV.

Referring to FIG. 7, the UAV broadcast system 800 is configured to execute the mission plan 804 autonomously by updating an access control packet 808 as the UAV traverses the boundaries of the geographical regions specified by the user in the mission plan 804. The UAV broadcast system 800 will execute a received mission plan 804 until a new mission plan 804 is received.

The UAV broadcast system 800 receives the mission plan 804 and stores it in a mission plan database 802. A resource access rights determination module 805 reads the mission plan from the mission plan database 802 and determines the current resource access rights 811 by comparing the access control rules specified in the mission plan 804 with the UAV's current location which is determined by the global positioning system (GPS) module 818. The current set of resource access rights 811 includes the group of receiver stations and their corresponding resource access rights for the current UAV location. For example, the current set of resource access rights can include a set of IDs corresponding to receiver stations which are authorized to decrypt the data broadcast by the UAV.

The first encryption module 806 receives the current set of resource access rights 811, a session key 816, and a list of receiver IDs associated with the receiver encryption keys 815. The first encryption module 806 first determines the encryption keys of the authorized receiver stations by comparing the current set of resource access rights 811 to the list of receiver IDs 815. The first encryption module then uses the determined encryption keys to encrypt a session key 816 such that each receiver station with access rights to the UAV's acquired data 810 can decrypt the session key 816. The result of the first encryption module 806 is an access control packet 808 that includes a list of authorized receiver IDs, each receiver ID associated with the encrypted session key that can be decrypted by that particular receiver station.

Periodically, and at least when resource access rights change, for instance, because the UAV traverses a region boundary, the UAV broadcast system 800 generates a new session key 816.

In parallel to the formation of the access control packet 808, the UAV broadcast system 800 receives data 810 acquired by the UAV. The acquired data 810 is stored in an acquired data database 852. The second encryption module 812 reads the acquired data 810 from the acquired data database 852 and uses the session key 816 to encrypt the acquired data 810. Both the encrypted acquired data and the access control packet 808 are broadcast to the receiver stations.

From the perspective of the receiver stations, this embodiment of the system 100 is no different than the first embodiment which was presented above. Thus, the receiver station configuration is the same as presented in FIG. 5.

In some alternative embodiments, the mission planning and execution system 100 presented in FIG. 1 can be configured to execute certain parts of the mission plan from the controller station 102 and other parts of the mission plan on the UAV 108. For example, the determination of resource access rights could be executed on the UAV 108 while the flight plan of the UAV is determined by the controller station 102.

8 Multiple UAV Relay

Figure 8:
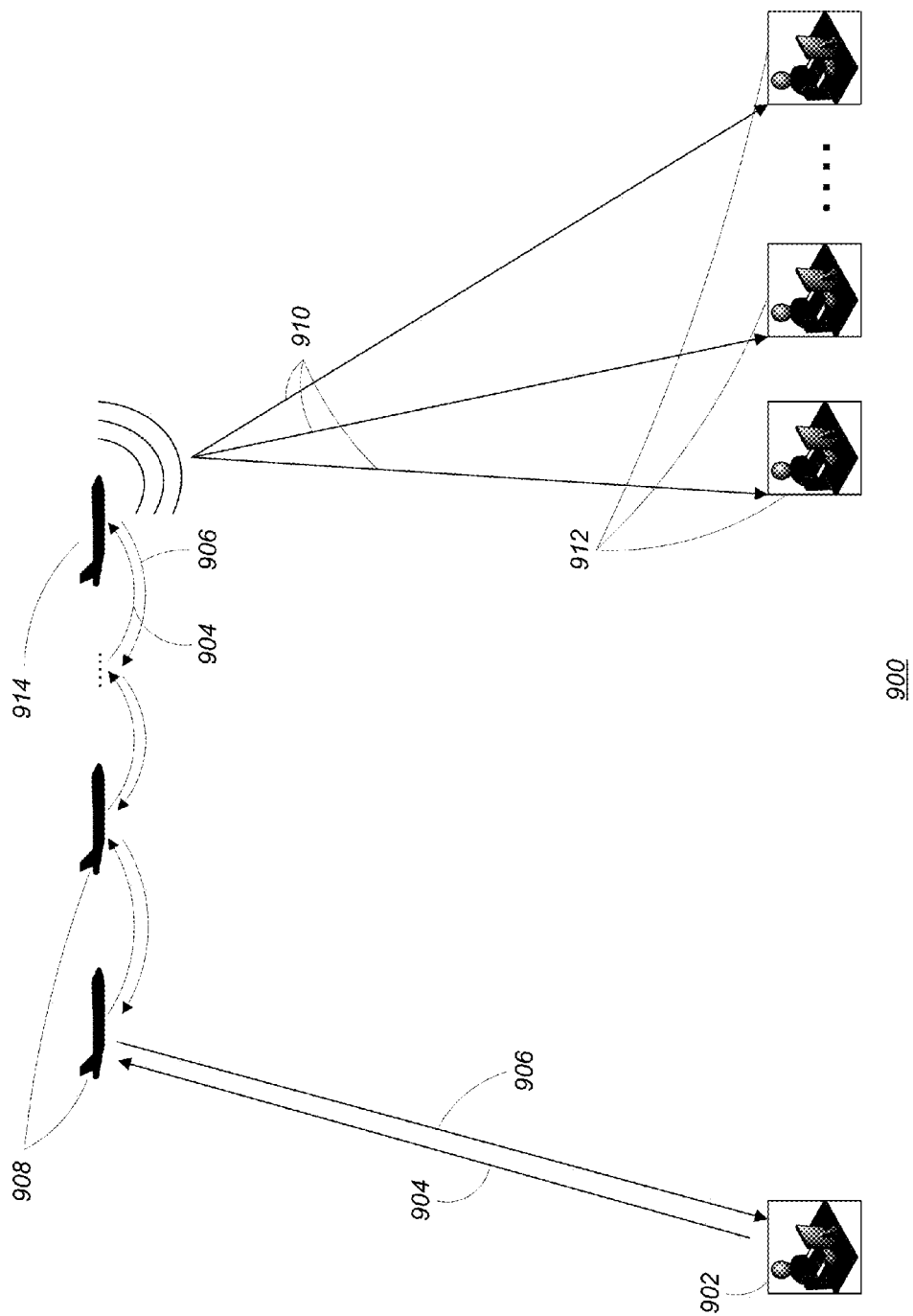
FIG. 8 is a block diagram of one embodiment of a UAV configured to execute a mission plan autonomously.

Referring to FIG. 8, an alternative mission planning and execution system 900 is configured to communicate over long distances or obstacles by relaying data through multiple intermediate UAVs 908 to reach an out of range UAV 914. This configuration can be used to reach UAVs 914 that would otherwise be out of the communication range of the controller station 902.

Information such as access control packets or mission plans 904 can be transmitted to an out of range UAV 914 and information such as geographical location 906 of the out of range UAV 914 can be relayed back to the controller station 902.

Thus, a mission plan can be executed to restrict a group of receiver stations' access to data 910 that is broadcast from a UAV that would otherwise be out of range of the controller station 902.

9 Authorizing Control of UAV Systems

In some examples, the UAV operator 214 may use the mission planning user interface 200 to authorize one or more of the receiver stations 112 to separately control one or more of the on board resources of the UAV. The process of authorizing receiver stations 112 to access resources on the UAV is simplified by obscuring the complex task of control authorization behind the easy to use mission planning user interface.

Figure 9:
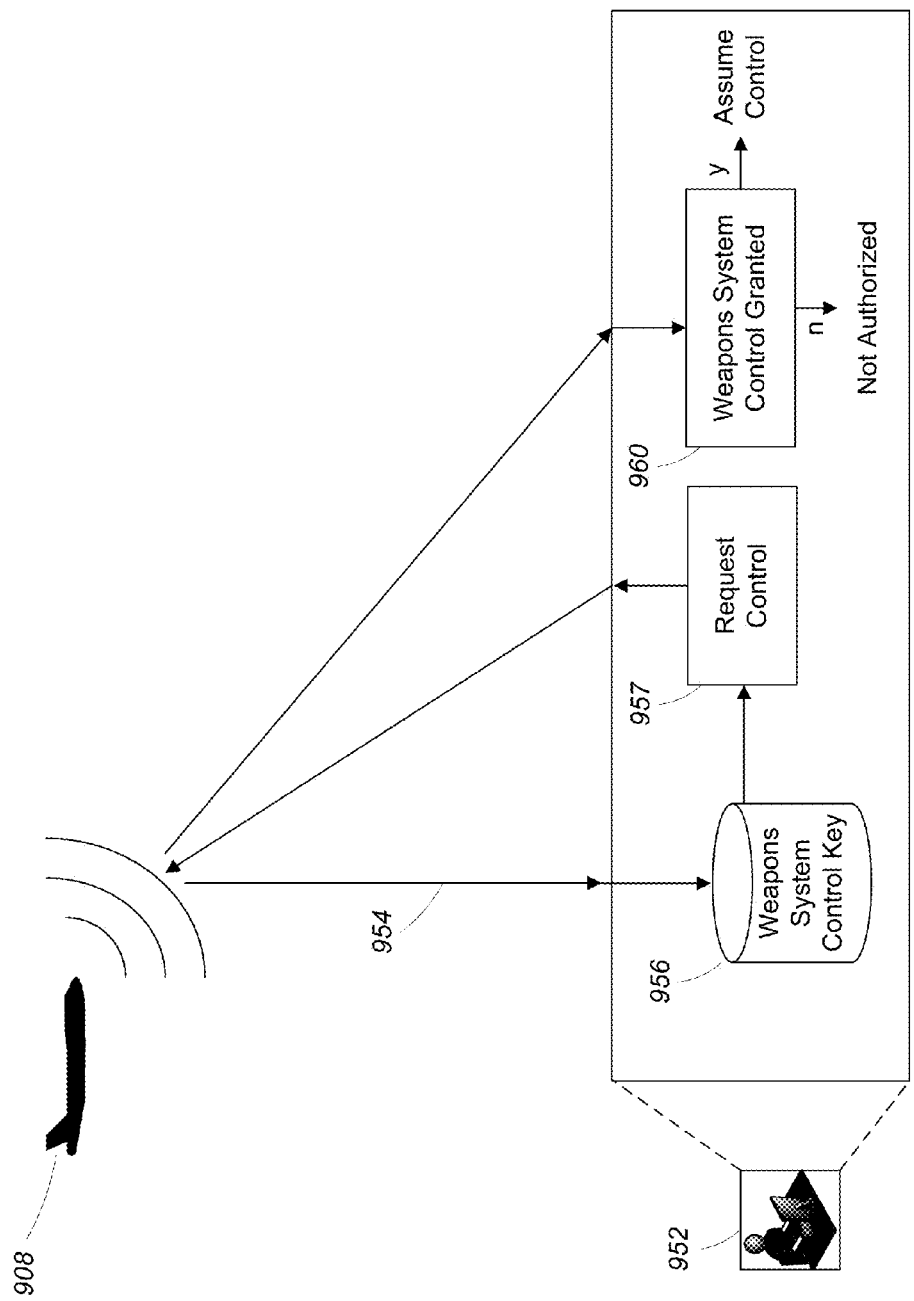
FIG. 9 is a high level overview of a mission planning and execution system configured to relay information from a controller station through intermediate UAVs to a target UAV.

In the example illustrated in FIG. 9, UAV operator 214 may grant a receiver station 952 a control key that authorizes them to request and obtain control of one or more of the on board resources of a UAV 958. For example, a receiver station 952 may be authorized to control the UAV's flight control system, weapons control system, or surveillance control system.

In FIG. 9, a weapons system control key 954 is provided to the receiver station 952 by the UAV 958, for example, when the UAV 958 is within a specific geographical region. In this example, the control key authorizes the receiver station 952 to control the UAV's weapons systems. The receiver station 952 stores the control key 954 in a database 956 and when necessary can send a control request 957, including the receiver station's control key 954, to the UAV 958. Upon receiving the control request 957, the UAV 958 can determine if the receiver station's control key 954 authorizes the receiver station 952 to control the requested resource (e.g., based a parameter such as geographical location). If the UAV 958 determines that the receiver station 952 is authorized to take control of the requested resource, then control is granted to the receiver station 952.

In certain cases the receiver station 952 may have its control authorization revoked. For example, control authorization may be revoked if the UAV 908 leaves the geographical region where the receiver station 952 is authorized to control the requested system.

Figure 10:
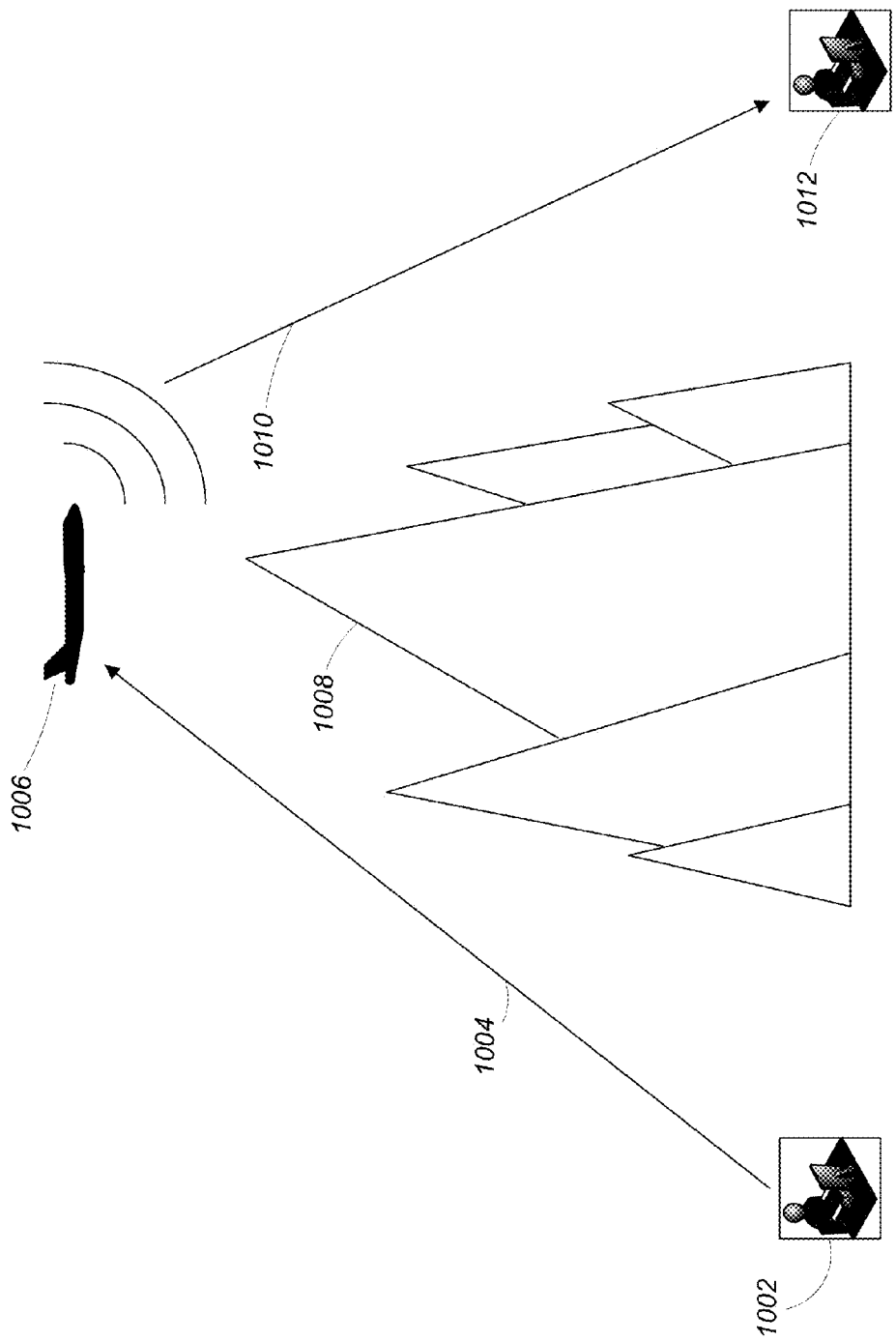
FIG. 10 is an overview of a mission planning and execution system configured to pass UAV control from one controller station to another controller station.

Referring to FIG. 10, another example of a mission planning and execution system 1000 is configured to pass control from a first controller station 1002 to a second controller station 1012 based on a mission plan. A typical scenario where this embodiment would be useful is when the flight path of the UAV 1006 causes the UAV 1006 and the first controller station 1002 to lose their communication link. For example, if the UAV 1006 flies behind an obstacle such as a mountain range 1008 the communication link may be lost.

Thus, the mission plan can be configured to pass control from the first controller station 1002 to the second controller station 1012 on the other side of the mountain range 1008 such that the UAV 1006 is always in communication with one of the controller stations 1002, 1012.

The passing of control can, for example, occur by sending the mission plan 1004, 1010 from the first controller station 1002 to the UAV 1006 and then from the UAV 1006 to the second controller station 1012.

Various criteria for deciding when to pass control from one controller station to another are possible. One example described above uses geographic regions to define where each controller station has the right to control the UAV. In another example, control is passed at a specific time of day, for example, when UAV operator shifts change.

10 Alternatives

In the examples described above, the mission planning user interface was used to enable a UAV operator to specify access control rules that were applied to restrict access to video being broadcast by a UAV. However, the mission planning user interface can enable the UAV operator to specify access control rules that can be applied to virtually any on board resource of the UAV. For example, the access control rules may grant a receiver station the right to control the flight path of the UAV, receive certain data from various sensors such as infrared cameras, control weapons systems, etc. In a specific example, a mission plan may grant a receiver station access to control the flight path of the UAV and to view a video feed from the UAV but deny the receiver station access to fire the weapons included on the UAV.

In some embodiments, the communication between the UAV and the receiver stations is two-way, allowing the receiver stations to send status information and commands back to the UAV.

The foregoing description only discusses a mobile broadcaster and stationary receiver stations. However, the mission planning system presented in the present application can function with a mobile broadcaster and stationary receiver stations, mobile receiver stations and a stationary broadcaster, or mobile receiver stations and a mobile broadcaster. For example, a geographical region can be specified around a mobile receiver such that the receiver is authorized in the specified region and not authorized outside of that region.

The mission planning user interface can be designed with minimal input requirements (e.g., optimized for a touch screen device). For example, when a receiver station receives control of the weapons systems of a UAV they may be presented with a simplified interface that allows them to operate the weapons systems using a smart phone device with a touch screen.

The foregoing description presented a system with a controller station controlling a single UAV. However, a controller station can specify a mission plan that includes multiple UAVs. Similarly, a controller station can specify a number of mission plans, one for each of a number of UAVs, and execute the mission plans in parallel. The UAV operator can use the mission planning user interface to display or hide the mission plans of individual UAVs.

The foregoing description presented geographical regions that were defined based on geographic coordinates. However, in some examples a region could be associated with mobile point such as a surveillance target. As the target moves, the region can move accordingly.

In some examples, when a particular target appears on the mission planning user interface, a pre-specified region and a pre-specified set of access control rules can be automatically created and associated with the target.

In some examples, in geographic regions where a communications infrastructure is unavailable, the UAV can function as a mobile network router (e.g., providing communications services such as telephone service, network routing, etc.) within the region. Access control rules can be specified such that access to the UAV for communication and other applications (e.g., text and voice) is restricted. For example, in a UAV with limited resources, restriction of access to the resources is necessary to ensure that authorized users have access to the resources.

In some examples, the mission planning user interface can be used to control access to the systems of different types of vehicles (e.g., buses, boats, aerostats, etc.).

In some examples, the mission planning user interface can be used to construct a mission plan that causes the UAV to perform tasks that are not related to communications (e.g., dispersing fertilizer onto a field or distributing medical supplies).

In some examples, the mission planning user interface can provide additional feedback to the UAV operator. For example, UAV status such as which parties currently control each system on the UAV, the security status of each system on the UAV, etc. can be displayed on the mission planning user interface.

In some examples, the UAV can produce different quality of service based on the access control rules. For example, some receiver stations may be authorized to receive a high quality video stream within a specified geographical region while other receiver stations are authorized to receive a low quality video stream within the same region. When no receivers within a geographical region are authorized to receive a specific quality of service, the specific quality of service may not be broadcast. This can conserve resources such as bandwidth and battery power. Furthermore, in some other examples, keys are distributed only to receivers that are actually online and within the correct geographical region.

In some examples, the mission control user interface can be used to simulate missions. For example, the flight of a UAV and location of receiver stations can be simulated such that access control rules are updated as the UAV traverses the geographical regions specified in a mission plan.

In some examples, a UAV operator can override a mission plan that is automatically executing and manually modify aspects of the mission plan (e.g., specify geographical regions, change resource access rights, modify the UAV flight plan, etc.).

In some examples, the access control rules for overlapping geographical regions are combined using, for example, a union operation. In other examples, each geographical region can be assigned a priority level. When geographical regions overlap, the access control rules for the zone with the greatest priority level are applied. If the priority levels of the overlapping zones are equal, the access control rules of the two geographical regions can be combined, for example, using a union operation.

In other examples, when geographical regions overlap, the region of overlap can be selected and unique access control rules can be defined for the region.

In the foregoing description, data was stored in a database before it was encrypted (e.g., video data was recorded to a database and read from the database for encryption). However, in some examples the encryption step can be accomplished in real time without the intermediary step of storing to a database.

In some examples, the different aspects of a mission plan can be specified in separate locations and combined on a controller station. For example, one computer could be used to specify the geographical regions and access control rules of a mission plan and another computer could be used to specify the UAV flight plan. Storage devices such as USB drives could be used to transport the separate mission plan components to the controller station where the components are combined.

In some examples, access control rules for receiver stations or groups of receiver stations can be specified using a two column table where one column indicates that the receiver station or group of receiver stations is authorized and the other column indicates that the receiver station or group of receiver stations is unauthorized. A mission planner can change authorization status by moving a slider corresponding to a receiver station or group of receiver stations from one column to another.

In other examples, each of the receiver stations is associated with a set of attributes. Some exemplary attributes are the name of the organization or unit that the receiver belongs to, the receiver's country code, the model number of the receiver equipment, the capabilities of the receiver (e.g., capable of receiving HD signals), whether or not the unit is blacklisted due to being stolen or cloned, etc. In some examples, the attributes are included in the receiver's digital certificate. In other examples, the attributes can appear in a database that lists various meta-information out the receivers. The receiver attributes can be used to specify access control rules for receiver stations or groups of receivers. In some examples, the specification of access control rules can include the application of logical expressions to the attributes (e.g., receiver group=country:US AND organization:Marines AND capability:HD signals).

In some examples, access to status information of a UAV may be restricted. For example, access control rules may be specified to restrict which receiver stations can receive the GPS coordinates, battery status, etc. of the UAV.

In some examples, the mission planning user interface can display additional views to the UAV operator. For example, the user interface could display reports or scenarios related to a specific mission plan.

In some examples, the mission plan specified at the mission planning user interface can be saved and exported to a local cryptographic card. When the exported plans are loaded onto a different mission planning user interface they can be adjusted and in some cases, saved.

In some examples, disconnected transfer of control is allowed while connected transfer of control is not. In other examples, connected transfer of control is allowed by disconnected transfer of control is not.

Although the previous examples are presented in the context of unmanned vehicles, other vehicles, which may be manned such as piloted airplanes, piloted helicopters, manned buses etc., could have their resources controlled in similar manner.

It is to be understood that the foregoing description is intended to illustrate and not to limit the scope of the invention, which is defined by the scope of the appended claims. Other embodiments are within the scope of the following claims.

What is claimed is:

1. A method for transportation of material comprising:
operating a material transportation vehicle according to a material transportation plan, the material transportation plan including
a representation of one or more regions within a geographical area, each of the regions being associated with a group of one or more communication stations;
a representation of a route of travel within the geographical area, the route of travel traversing a first region of the one or more regions within the geographical area;
the operating including:
causing the material transportation vehicle to travel along the route of travel including causing the material transportation vehicle to enter the first region;
accepting control information originating from a first communication station of the group of one or more communication stations associated with the first region, the first communication station being authorized to control a material transportation resource of the material transportation vehicle in the first region, and
causing an exchange of the material according to the accepted control information.

2. The method of claim 1 wherein causing the exchange of the material according to the accepted control information includes causing a delivery of the material.

3. The method of claim 2 wherein the control information includes a command for authorizing delivery of the material to a delivery location within the first region.

4. The method of claim 2 wherein the first communication station being authorized to control a material transportation resource of the material transportation vehicle in the first region includes the first communication station being authorized to control the delivery of the material in the first region.

5. The method of claim 1 wherein the control information includes one or more commands for controlling the path of travel of the material transportation vehicle.

6. The method of claim 1 wherein accepting control information originating from the first communication stations includes accepting control information originating from the first communication when the first communication station is within the region.

7. The method of claim 1 wherein,
each of the one or more regions is associated with material transportation resource access rights; and
operating the material transportation vehicle according to the material transportation plan includes determining whether the first communication station is authorized to control the material transportation resource of the material transportation vehicle in the first region based on the first communication station's association with the first region and the material transportation resource access rights associated with the first region.

8. The method of claim 1 wherein the material transportation vehicle is unmanned.

9. The method of claim 1 wherein the material transportation vehicle is an aerial vehicle.

10. The method of claim 1 wherein the material transportation vehicle is a ground based vehicle.

11. The method of claim 1 wherein the material transportation vehicle is a water based vehicle.

12. The method of claim 1 wherein the material includes munitions.

13. The method of claim 1 wherein the material includes agricultural material.

14. The method of claim 1 wherein the material includes medical material.

* * * * *